US010069190B2

(12) United States Patent
Aoki

(10) Patent No.: US 10,069,190 B2
(45) Date of Patent: Sep. 4, 2018

(54) ANTENNA, WIRELESS COMMUNICATION DEVICE, AND ELECTRONIC DEVICE

(71) Applicant: CANON KABUSHIKI KAISHA, Tokyo (JP)

(72) Inventor: Makoto Aoki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 15/386,368

(22) Filed: Dec. 21, 2016

(65) Prior Publication Data

US 2017/0214119 A1    Jul. 27, 2017

(30) Foreign Application Priority Data

Jan. 21, 2016   (JP) ................................ 2016-009751

(51) Int. Cl.
| | | |
|---|---|---|
| *H01Q 1/52* | (2006.01) | |
| *H01Q 1/22* | (2006.01) | |
| *H01Q 1/38* | (2006.01) | |
| *H01Q 1/48* | (2006.01) | |
| *H04B 1/3827* | (2015.01) | |
| *H04W 88/02* | (2009.01) | |

(52) U.S. Cl.
CPC .............. *H01Q 1/2291* (2013.01); *H01Q 1/38* (2013.01); *H01Q 1/48* (2013.01); *H01Q 1/526* (2013.01); *H04B 1/3838* (2013.01); *H04W 88/02* (2013.01)

(58) Field of Classification Search
CPC .......... H01Q 1/2291; H01Q 1/48; H01Q 1/52; H01Q 1/526
See application file for complete search history.

(56) References Cited

U.S. PATENT DOCUMENTS

| | | | | |
|---|---|---|---|---|
| 6,774,850 B2 * | 8/2004 | Chen | ......................... | H01Q 1/38 343/700 MS |
| 2007/0229366 A1 * | 10/2007 | Kim | ....................... | H01Q 1/243 343/700 MS |

(Continued)

FOREIGN PATENT DOCUMENTS

JP    2005-184703 A    7/2005

OTHER PUBLICATIONS

Atsushi Igarashi, et al., "Development of Reduction Technology of the Electromagnetic Wave Exposure for Biologic Body". The Institute of Electronics, Information and Communication Engineers 2008, Feb. 28, 2009, p. 67, B4.

*Primary Examiner* — Hoang Nguyen
(74) *Attorney, Agent, or Firm* — Fitzpatrick, Cella, Harper & Scinto

(57) ABSTRACT

An antenna includes: a substrate on or in which an antenna element part having an open end, a signal line connected to the antenna element part, and a first ground conductor connected to the antenna element part are formed; and a printed wiring board in which a second ground conductor electrically connected to the first ground conductor is formed in a different layer from the first ground conductor, wherein the second ground conductor has a shield part that partially overlaps with the antenna element part including a connection part between the antenna element part and the signal line and a connection part between the antenna element part and the first ground conductor and does not overlap with the open end of the antenna element part when viewed from a normal direction of the printed wiring board.

9 Claims, 12 Drawing Sheets

(56) References Cited

U.S. PATENT DOCUMENTS

2013/0093642 A1*  4/2013  Kurashima .............. H01Q 1/38
                                                      343/848
2016/0241288 A1   8/2016  Aoki et al.

* cited by examiner

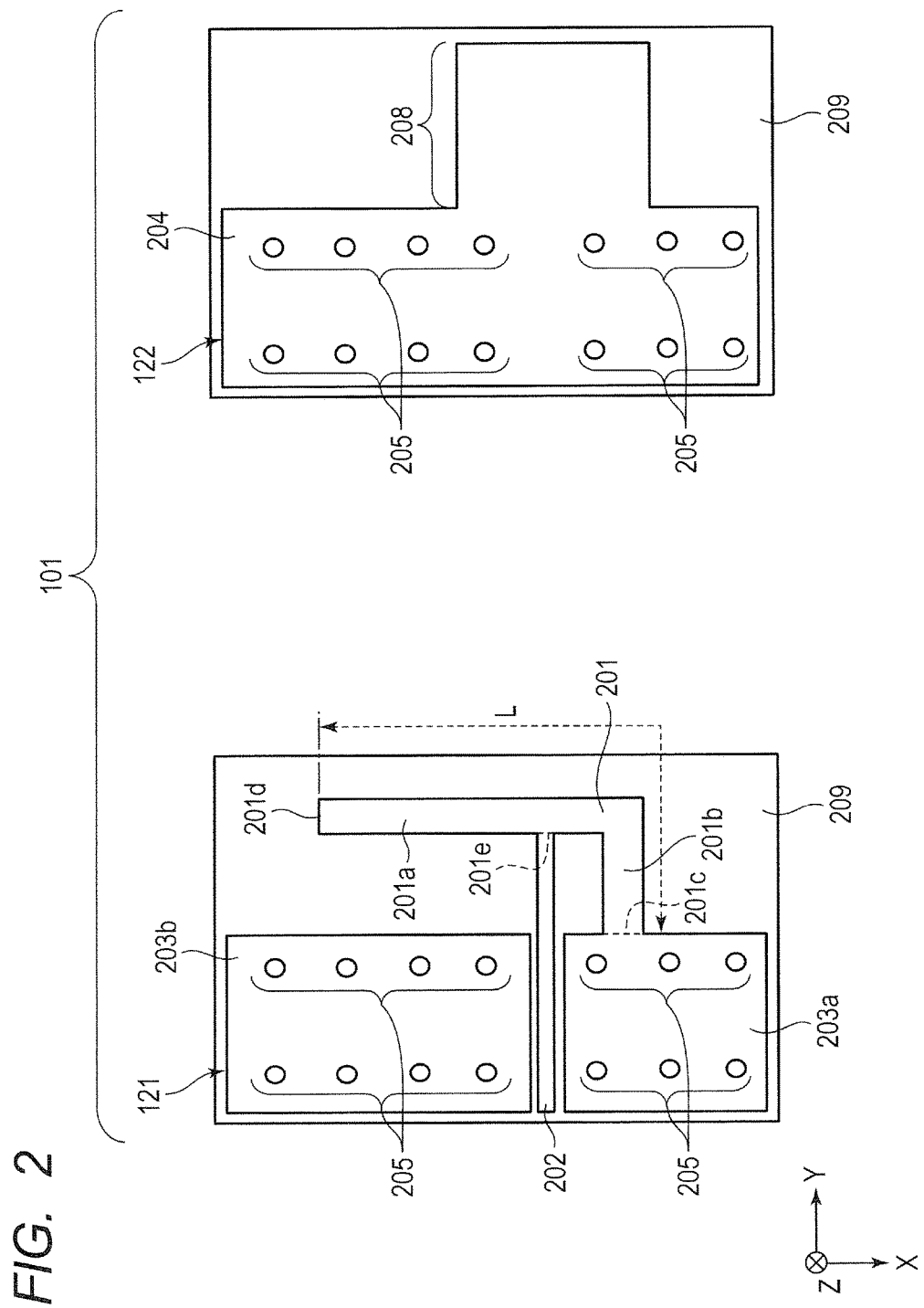

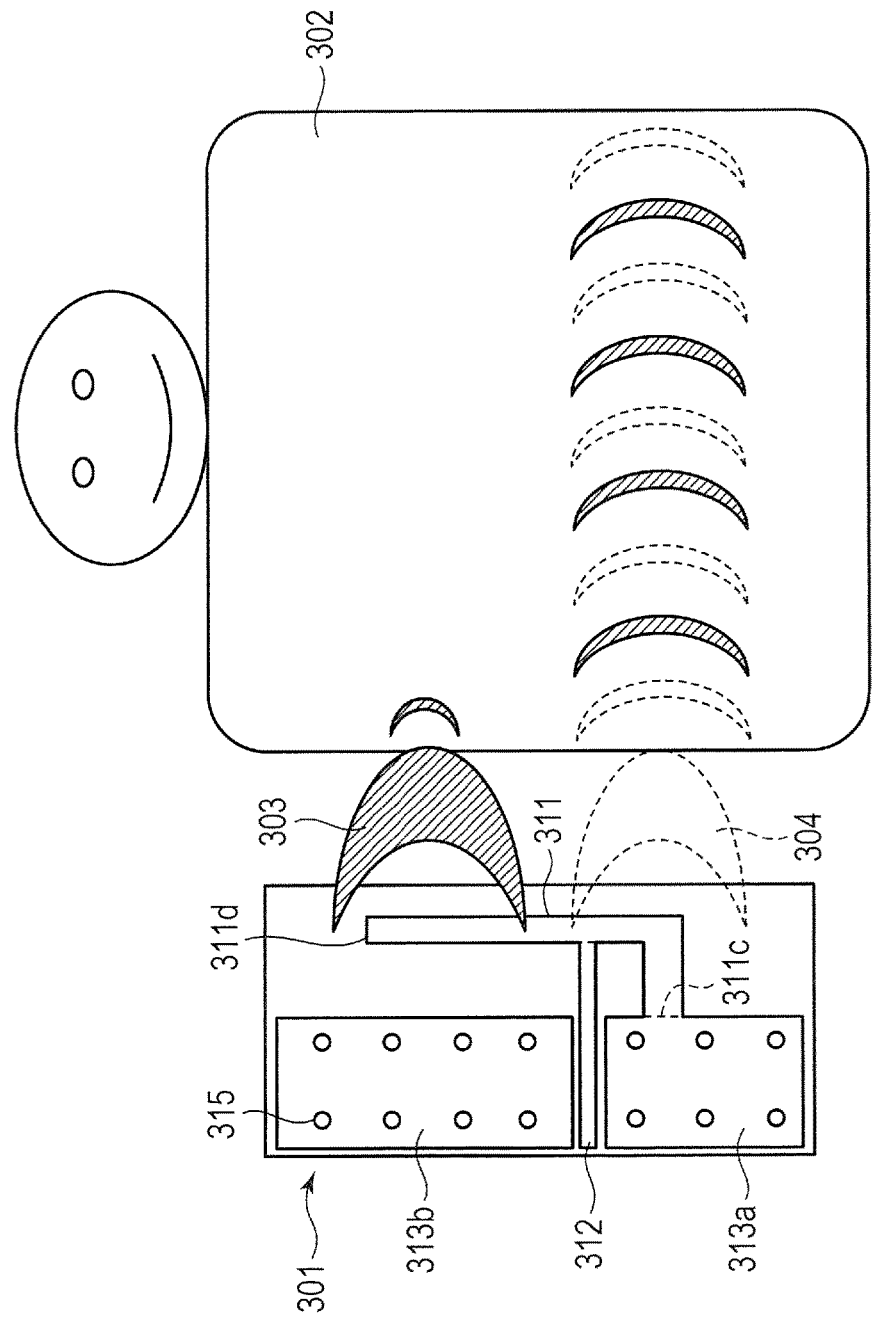

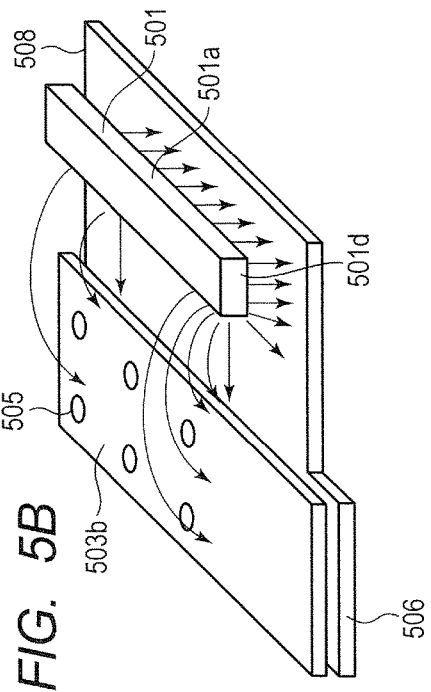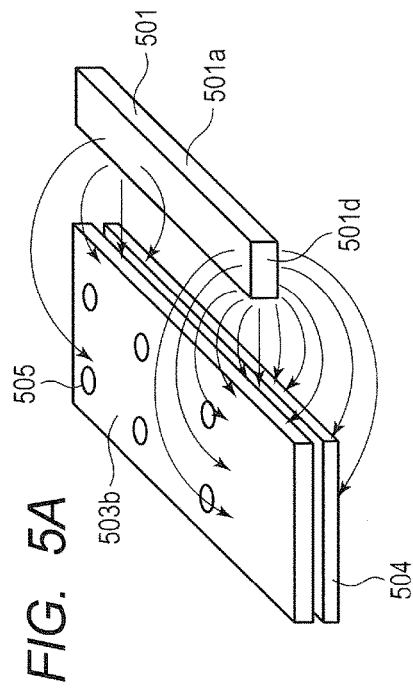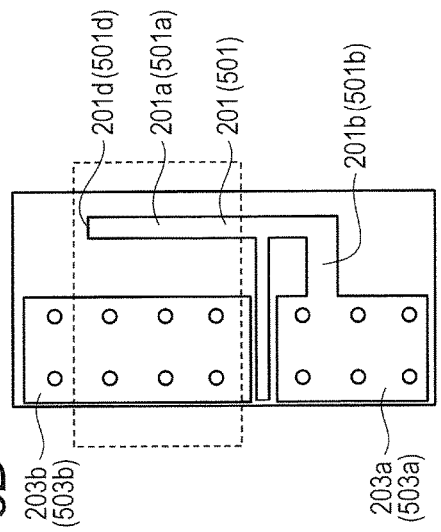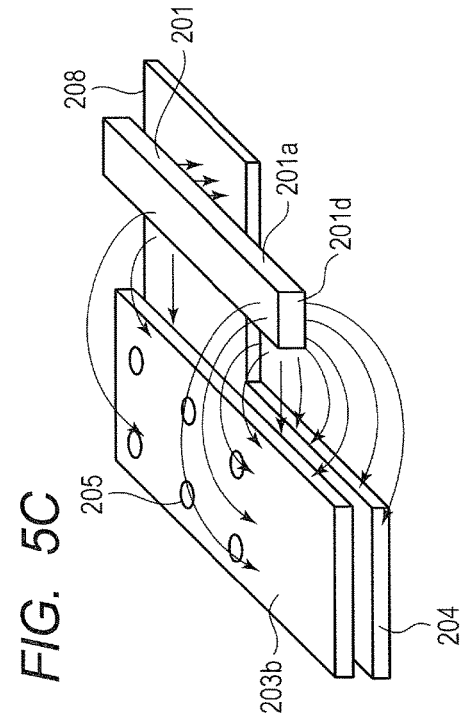

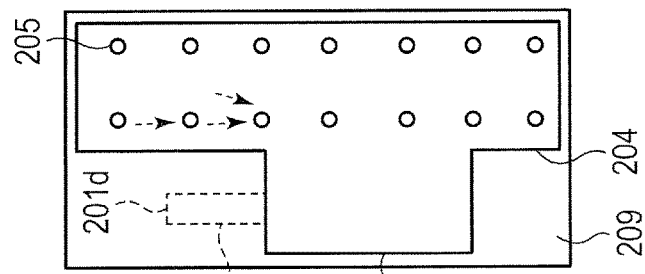
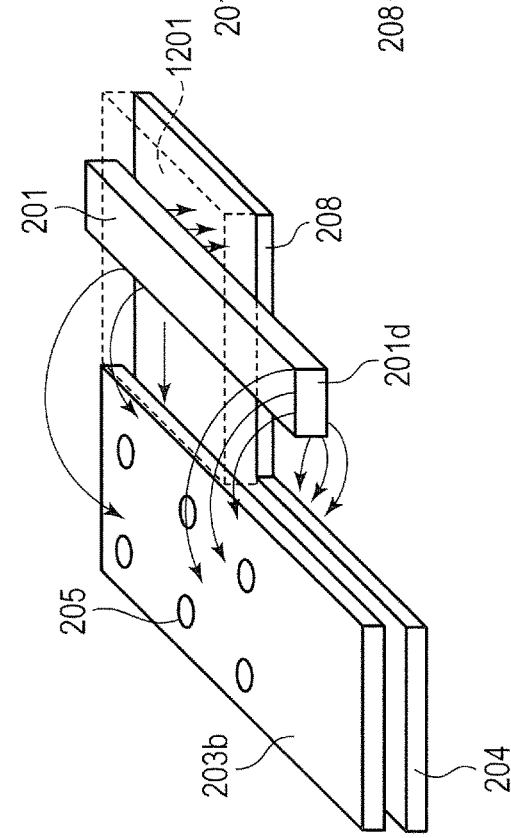
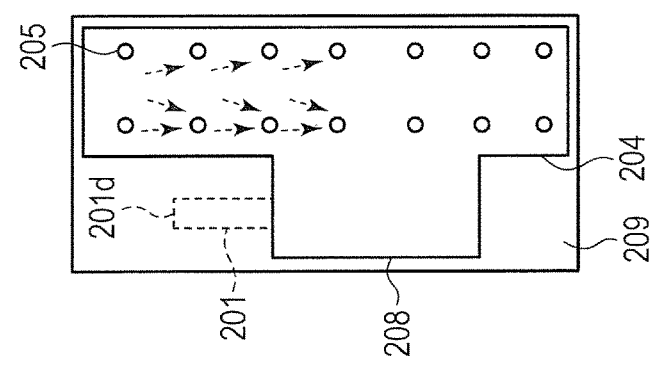

ANTENNA, WIRELESS COMMUNICATION DEVICE, AND ELECTRONIC DEVICE

BACKGROUND OF THE INVENTION

Field of the Invention

The present invention relates to an antenna, a wireless communication device, and an electronic device.

Description of the Related Art

In recent years, in imaging devices such as digital cameras, and other electronic devices, for example, a wireless communication device having a wireless function is mounted. An electronic device in which a wireless communication device is mounted is able to wirelessly transmit a signal such as a captured image to another camera, a personal computer (PC), or the like by using a wireless Local Area Network (LAN), Bluetooth (registered trademark), or the like. Radio waves of 2.4 GHz, 5 GHz, and the like are used in a wireless communication by a wireless LAN, Bluetooth (registered trademark), and the like. A wireless communication device may be built into an electronic device or may be installed as an external option in an imaging device such as a digital single-lens reflex camera, for example. With installation of such an option in an imaging device, it is possible to wirelessly communicate with another device at a distance of 100 meters or more, for example.

With respect to this type of wireless communication devices, there is a concern that, when a high power electromagnetic wave emitted from the antenna enters a human body and the energy of the electromagnetic wave is absorbed in the human body, a local rise in temperature may occur in the human body. It is indicated that such a local rise in temperature of a human body is likely to increase a risk of development of cataract or the like, for example. Therefore, in each country, an amount of absorption of electromagnetic waves by a human body is evaluated as Specific Absorption Ratio (SAR), and a regulation value thereof is defined.

In respect to a technique for suppressing the SAR below a regulation value, "Development of Reduction Technology of the Electromagnetic Wave Exposure for Biologic Body", Atsushi Igarashi et al., The Institute of Electronics, Information and Communication Engineers 2008, Tokyo branch student council, a meeting for presenting research papers, Feb. 28, 2009, p. 67, B-4 (hereafter, referred to as "Igarashi et al.") discloses that the SAR is inversely proportional to the square of the distance between an antenna and a phantom.

Further, Japanese Patent Application Laid-open No. 2005-184703 discloses that, for improving the SAR, a part of an electromagnetic wave emitted from the antenna element is shielded by a symmetrically structured ground plane adapted to a symmetrically structured antenna element.

According to Igarashi et al., the SAR value can be reduced by putting an antenna away from a human body. In order to put an antenna away from a human body, however, it is necessary to secure a larger space between an antenna and an outer casing of an electronic device accommodating the antenna. This results in an increased external size of the electronic device and it is therefore difficult to reduce the size or the thickness of the electronic device including an antenna.

SUMMARY OF THE INVENTION

The present invention intends to provide an antenna, a wireless communication device, and an electronic device that can realize a reduction in size and/or thickness of the wireless communication device and the electronic device while reducing the SAR value.

An aspect of the present invention provides an antenna including a substrate on or in which an antenna element part having an open end, a signal line connected to the antenna element part, and a first ground conductor connected to the antenna element part are formed; and a printed wiring board in which a second ground conductor electrically connected to the first ground conductor is formed in a different layer from the first ground conductor, wherein the second ground conductor has a shield part that partially overlaps with the antenna element part including a connection part between the antenna element part and the signal line and a connection part between the antenna element part and the first ground conductor and does not overlap with the open end of the antenna element part when viewed from a normal direction of the printed wiring board.

Another aspect of the present invention provides a wireless communication device including the above-described antenna.

Further another aspect of the present invention provides an electronic device including: the above-described antenna; a communication unit that transmits or receives a signal via the above-described antenna; and a signal processing unit that processes the signal.

Further features of the present invention will become apparent from the following description of exemplary embodiments with reference to the attached drawings.

BRIEF DESCRIPTION OF THE DRAWINGS

FIG. 2 is a plan view illustrating an antenna according to the first embodiment of the present invention.

FIG. 3 is a view schematically illustrating an electromagnetic field distribution around the antenna and in a human body.

FIG. 5A, FIG. 5B, FIG. 5C, and FIG. 5D are views schematically illustrating electric field distributions around the antenna element part.

FIG. 13A, FIG. 13B, and FIG. 13C are views schematically illustrating electric fields and current distributions on ground conductors for cases of presence and absence of a partially arranged high permittivity material.

DESCRIPTION OF THE EMBODIMENTS

Preferred embodiments of the present invention will now be described in detail in accordance with the accompanying drawings.

First Embodiment

An antenna, a wireless communication device, and an electronic device according to the first embodiment of the present invention will be described with reference to FIG. 1 through FIG. 11.

Figure 1:
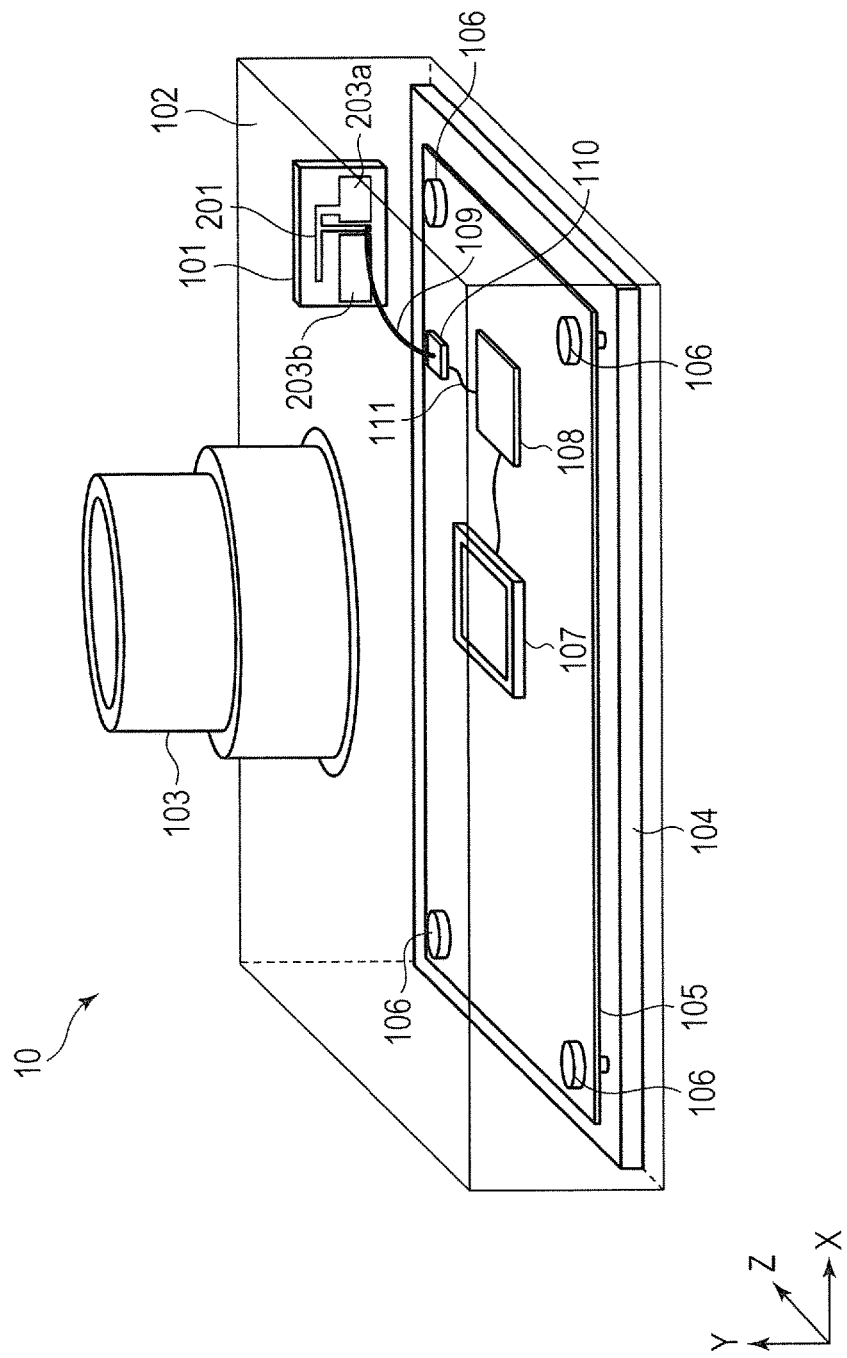
FIG. 1 is a perspective view illustrating an electronic device according to a first embodiment of the present invention.

FIG. 1 is a perspective view illustrating an electronic device according to the present embodiment. FIG. illustrates a digital still camera (hereafter, simply referred to as camera) 10 that is an imaging device as the electronic device of the present embodiment. The camera 10 has a built-in antenna 101 of the present embodiment and thus has a wireless communication function.

As illustrated in FIG. 1, the camera 10 has a non-conductive outer casing 102, a lens barrel 103 provided in the front side of the outer casing 102, and the antenna 101 of the present embodiment provided inside the outer casing 102.

In the backside in the outer casing 102, a plate-like metal member 104 that supports components in the camera 10 is provided. Inside the outer casing 102, a printed circuit board 105 is supported by and fixed to the metal member 104 by screws 106. An image sensor 107 that receives an optical signal that has passed through the lens barrel 103 and converts the received optical signal into an image signal, which is an electrical signal, is provided on the printed circuit board 105. Further, an integrated circuit (IC) 108 that processes an image signal generated by the image sensor 107 is provided on the printed circuit board 105.

Furthermore, a connector 110 is implemented on the printed circuit board 105. The connector 110 is electrically connected to the IC 108 through a wiring 111 provided in the printed circuit board 105. Further, the antenna 101 of the present embodiment provided inside the outer casing 102 is connected to the connector 110 through a cable 109.

The IC 108 is configured to not only function as a signal processing unit that processes image signals and other signals but also function as a communication unit that transmits image signals and transmits and receives other signals via the antenna 101. The IC 108, which functions as a communication unit also in such a way, together with the antenna 101 form a wireless communication device. For example, the IC 108 can process an image signal generated by the image sensor 107 to modulate the image signal with a frequency in a communication frequency band and wirelessly transmit the modulated signal wave via the antenna 101. As a communication frequency band, a 2.4 GHz band and a 5 GHz band can be utilized, for example.

The antenna 101 is fixed so as to be located, for example, on an inner side face of the outer casing 102 of the camera in order to increase the distance from the metal member 104 such that the metal member 104 less affects the radio wave radiation of the antenna 101. Note that a fixing location of the antenna 101 inside the outer casing 102 is not limited in particular and can be determined in accordance with a required performance or the like.

FIG. 2 is a plan view illustrating the antenna of the present embodiment. The antenna 101 of the present embodiment is an inverted F antenna that is formed of a printed wiring board having at least two wiring layers (conductive layers).

As illustrated in FIG. 2, a plate-like or sheet-like printed wiring board forming the antenna 101 has at least a first wiring layer 121 that is a first conductive layer and a second wiring layer 122 that is a second conductive layer that is different from the first wiring layer 121. The first wiring layer 121 and the second wiring layer 122 are formed on or in a plate-like or sheet-like substrate 209 forming a dielectric between these layers. For example, in the printed wiring board forming the antenna 101, the substrate 209 is formed of stacked dielectric layers, and the first wiring layer 121 and the second wiring layer 122 are formed on the surface of the substrate 209 or inside the dielectric layer forming the substrate 209. Further, for example, the printed wiring board forming the antenna 101 may be a double-sided printed wiring board in which the first wiring layer 121 and the second wiring layer 122 are formed on one of the surfaces and the other surface of the substrate 209, respectively. In FIG. 2, the first wiring layer 121 is depicted in the left, and the second layer 122 is depicted in the right.

Inside the outer casing 102 of the camera 10, the antenna 101 is attached to the inner face of a side wall of the outer casing 102 such that the first wiring layer 121 is located inside and the second wiring layer 122 is located outside.

The antenna 101 of the present embodiment, which is an inverted F antenna, has an antenna element part formed to radiate a magnetic wave with a high efficiency at a communication frequency and a signal line 202 electrically connected to the cable 109. The antenna element part 201 and the signal line 202 are formed in the first wiring layer 121, respectively.

Further, the antenna 101 has ground conductors 203a and 203b formed in the first wiring layer 121, which is on the same layer as the antenna element part 201, and a ground conductor 204 formed in the second wiring layer 122, which is on the different layer from the antenna element part 201. The antenna 101 further has vias 205 electrically connecting the ground conductors 203a and 203b to the ground conductor 204.

In the printed wiring board forming the antenna 101, each of the antenna element part 201, the signal line 202, the ground conductors 203a, 203b, and 204, and the vias 205 is formed of a conductive material. Further, the substrate 209 that is other than the above components is formed of a dielectric such as a Flame Retardant Type 4 (FR4).

The antenna element part 201, the signal line 202, and the ground conductors 203a and 203b formed in the first wiring layer 121 are formed as described below, respectively.

The antenna element part 201 has an L-shaped strip-like planer shape and has a longer part 201a that is a first part and a shorter part 201b that is a second part. The shorter part 201b is bent from the longer part 201a in a direction orthogonal to the longer part 201a and is shorter than the longer part 201a. Note that, although FIG. 2 depicts the antenna element part 201 having the longer part 201a and the shorter part 201b both having a strip-like planer shape with a constant width, the planer shape of the antenna element part 201 is not limited thereto and may be various planer shapes. Further, the direction in which the shorter part 201b is bent is not required to be the direction orthogonal to the longer part 201a and may be any direction intersecting the longer part 201a.

The size L that is the total length of the antenna element part 201 including the longer part 201a and the shorter part 201b is, for example, one-fourth the wavelength λ of an electromagnetic wave at a communication frequency in order to emit the electromagnetic wave at a high efficiency. Note that FIG. 2 indicates a Cartesian coordinate system having an X-axis, a Y-axis, and a Z-axis orthogonal to each other. In FIG. 2, the longitudinal direction of the longer part 201a is in a direction parallel to the X-axis. The longitudinal direction of the shorter part 201b is in a direction parallel to the Y axis. The plate face of the printed wiring board forming the antenna 101 is perpendicular to the direction parallel to the Z-axis. FIG. 1 and FIG. 6A, FIG. 6B, FIG. 6C, and FIG. 7 described below represent the same Cartesian coordinate system as FIG. 2.

Further, the antenna element part 201 is electrically connected to the signal line 202 and the ground conductor 203a. Note that the antenna element part 201 is electrically connected to the ground conductor 204 and the ground conductor 203b by connections between the ground conductors 203a and 203b and the ground conductor 204 through the vias 205 as described later.

One end of the antenna element part 201 in the shorter part 201b side with respect to the size L forms a connection part 201c to the ground conductor 203a, and the other end in the longer part 201a side forms an open end 201d that is not connected to the ground conductor 203a and 203b. Further, in the antenna element part 201, a portion of the longer part 201a in the shorter part 201b side forms a connection part 201e to the signal line 202.

The signal line 202 is formed in a strip-like shape parallel to the longitudinal direction of the shorter part 201b in the side to which the shorter part 201b is bent with respect to the longer part 201a, and is connected to the longer part 201a at the connection part 201e. Note that, although FIG. 2 depicts the signal line 202 that has a strip-like planer shape with a constant width, the planer shape of the signal line 202 is not limited thereto and may be various planer shapes.

The ground conductors 203a and 203b that are first ground conductors are formed in both sides of the signal line 202 such that each of the ground conductors 203a and 203b has a rectangular planer shape whose pair of sides are parallel to the longitudinal direction of the longer part 201a. Note that each of the planer shapes of the ground conductors 203a and 203b is not limited to a rectangular and may be various shapes.

The ground conductor 203a formed in the shorter part 201b side of the signal line 202 is connected to the shorter part 201b at the connection part 201c. That is, the end in the shorter part 201b side of the antenna element part 201 is connected to the ground conductor 203a.

In the antenna 101 of the present embodiment, in addition to the ground conductors 203a and 203b formed in the first wiring layer 121, the ground conductor 204 is formed in the second wiring layer 122 that is different from the first wiring layer 121. The radiation characteristics of the antenna 101 can be stabilized by the ground conductor 204 being formed in addition to the ground conductors 203a and 203b. Furthermore, this can suppress the variation of radiation characteristics among a plurality of the antennae 101 to a smaller level when the plurality of the antennae 101 are manufactured.

The ground conductor 204 formed in the second wiring layer 122 is formed as described below.

The ground conductor 204 that is the second ground conductor is formed so as to have a rectangular portion whose planer shape overlaps with the ground conductors 203a and 203b correspondingly to the ground conductors 203a and 203b formed in the first wiring layer 121. Furthermore, the ground conductor 204 is formed to have a convex part 208 protruding toward the antenna element part 201 side from the rectangular portion described above. The ground conductor 204 is electrically connected to the ground conductors 203a and 203b via the plurality of vias 205 in rectangular portions overlapping with the ground conductors 203a and 203b, respectively.

The convex part 208 formed to the ground conductor 204 functions as a shield part that shields a magnetic field as described later. The convex part 208 is formed so as to have a rectangular planer shape whose pair of sides are parallel to the longitudinal direction of the shorter part 201b, for example. Note that the planer shape of the convex part 208 is not limited to a rectangular and may be various shapes.

The convex part 208 that functions as a shield part is formed so as to partially overlap with the antenna element part 201 when viewed from the normal direction of the printed wiring board forming the antenna 101, that is, viewed from the Z-axis direction of FIG. 2. More specifically, the convex part 208 partially overlaps with the antenna element part 201 including the connection part 201e between the signal line 202 and the antenna element part 201 and the connection part 201c between the ground conductor 203a and the antenna element part 201 when viewed from the Z-axis direction. On the other hand, the convex part 208 does not overlap with the open end 201d of the antenna element part 201 when viewed from the Z-axis direction.

In the antenna 101 of the present embodiment, as described above, when viewed from the Z-axis direction of FIG. 2 that corresponds to the normal direction of the printed wiring board forming the antenna 101, the convex part 208 which overlaps with a part of the antenna element part 201 is formed to the ground conductor 204. The convex part 208 is formed in a region which partially overlaps with the antenna element part 201 including the connection part 201e between the signal line 202 and the antenna element part 201 and the connection part 201c between the ground conductor 203a and the antenna element part 201 and does not overlap with the open end 201d.

Further, as illustrated in FIG. 1 and FIG. 2, the antenna 101 is arranged such that the ground conductors 203a and 203b are located inside the outer casing 102 and the ground conductor 204 having the convex part 208 is located outside the outer casing 102. That is, when a parson holds the camera 10, the ground conductor 204 having the convex part 208 is located closer to the person's body holding the camera 10 than the ground conductors 203a and 203b.

Because the convex part 208 that partially overlaps with the antenna element part 201 is formed to the ground conductor 204 as described above, the antenna 101 of the present embodiment can reduce the SAR value, which is a value of the SAR, while suppressing degradation of the radiation characteristics. Moreover, since the antenna 101 of the present embodiment is not required to secure a large space between the antenna 101 and the outer casing 102 for reducing the SAR value, a reduction in size and/or thickness of the camera 10 can be realized. That is, the antenna 101 of the present embodiment reduces the SAR value, which is the value of the SAR, while effectively suppressing degradation of the radiation characteristics by using the component (the ground conductor 204) which itself forms the antenna.

In the following, the principle by which the configuration of the antenna 101 of the present embodiment reduces the SAR value while suppressing a decrease in the radiation efficiency will be described by using FIG. 3 through FIG. 5D in this order.

FIG. 3 is a view schematically illustrating an electromagnetic field distribution around an inverted F antenna 301 where no convex part 208 is formed and in a human body 302 for showing that the magnitude of the SAR value correlates with the magnetic field intensity around an antenna. Description will be provided in comparison with the configuration described above for FIG. 2.

The inverted F antenna 301 has an antenna element part 311 corresponding to the antenna element part 201, a signal line 312 corresponding to the signal line 202, and ground conductors 313a and 313b corresponding to the ground conductors 203a and 203b. On the other hand, although the inverted F antenna 301 has a ground conductor (not illustrated) corresponding to the ground conductor 204, this ground conductor is different from the ground conductor 204 in that it has no portion corresponding to the convex part 208. The inverted F antenna 301 has vias 315 corresponding to the vias 205 connecting the ground conductor formed in the different wiring layer.

In response to emission of an electromagnetic wave from the inverted F antenna 301, an electric field 303 and a magnetic field 304 are formed near the inverted F antenna 301 and the human body 302 located near the inverted F antenna 301, respectively. In FIG. 3, the electric field 303 is represented by falcate black patterns, and the magnetic field 304 is represented by falcate patterns with dashed lines.

First, around the inverted F antenna 301, the electric field 303 is mainly formed near an open end 311d of the antenna element part 311 due to a relatively high impedance. On the other hand, the magnetic field 304 is mainly formed near a connection part 311c between the antenna element part 311 and the ground conductor 313a due to a relatively low impedance.

When the human body 302 approaches the inverted F antenna 301 where the electric field 303 and the magnetic field 304 are formed as described above, the electric field 303 near the inverted F antenna 301 rarely propagates into the human body 302 and only the magnetic field 304 propagates into the human body 302 as illustrated in FIG. 3. The reason why the electric field 303 rarely propagates into the human body 302 is that the relative permittivity of the human body 302 is as high as approximately 50 and, when considering an equation of the relationship between an electric flux intensity D and an electric field E, namely, $D=\varepsilon E$, the electric field sharply attenuates down to approximately 1/50 in the interface between the human body 302 and the air where the electric flux is continuous. In contrast, the reason why the magnetic field 304 propagates into the human body 302 is that the relative permittivity of the human body 302 is 1 that is the same as the air and, when considering an equation of the relationship between a magnetic flux density B and a magnetic field H, namely, $B=\mu H$, the magnetic field does not attenuate in the interface between the human body 302 and the air where the magnetic field is continuous.

The magnetic field that has propagated into the human body 302 then propagates inside the human body 302 as an electromagnetic wave with an electric field and a magnetic field due to wavelength shortening calculated by an equation, $\lambda=c/(f\times \text{the square root of } \varepsilon_r)$, where $\lambda$ represents a wavelength of an electromagnetic wave propagating in a medium, c represents the light velocity in a vacuum, f represents a frequency of an electromagnetic wave propagating in the medium, and $\varepsilon_r$ represents a relative permittivity of the medium. As an example of wavelength shortening, when the frequency f is 5 GHz and c is $3\times 10^8$ m/s, the wavelength is calculated to be as low as 8.3 mm inside the human body 302, while it is 60 mm in the air.

From the above discussion, it can be seen that what correlates with the magnitude of the SAR value is the magnetic field intensity around the inverted F antenna 301.

Figure 4A:
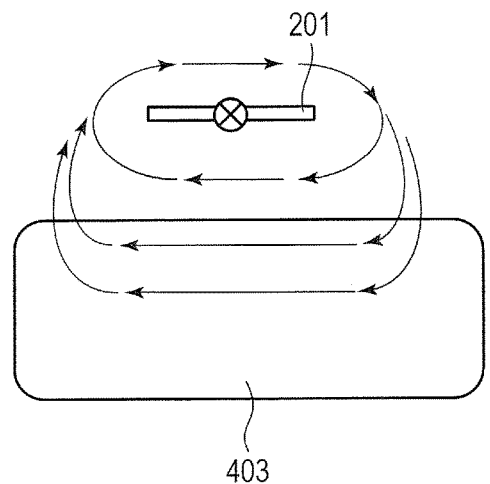
FIG. 4A, FIG. 4B, and FIG. 4C are views schematically illustrating currents flowing in an antenna element part and a magnetic field distribution nearby.
Figure 4B:
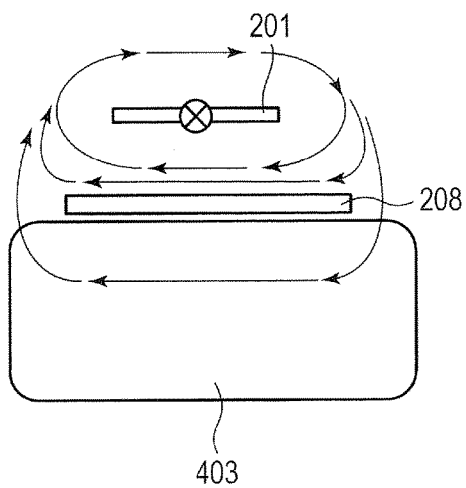
Figure 4C:
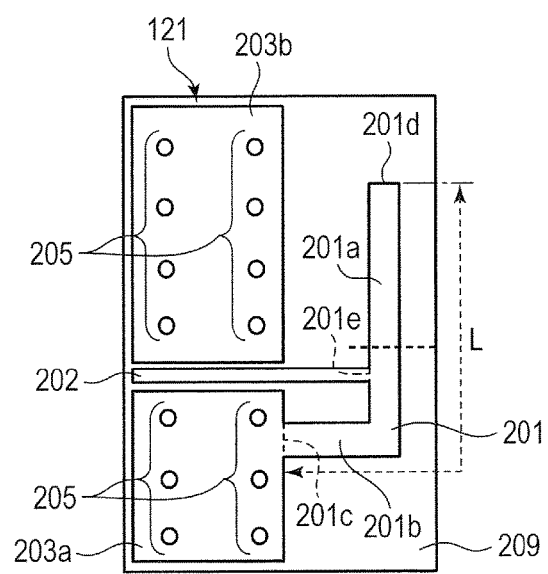

FIG. 4A, FIG. 4B, and FIG. 4C are views schematically illustrating currents flowing in the antenna element part 201 and magnetic fields distribution nearby for illustrating the principle by which the SAR value is reduced by the convex part 208 being formed to the ground conductor 204. FIG. 4A and FIG. 4B are sectional views taken along a dashed line of an antenna illustrated in FIG. 4C, respectively, and FIG. 4A illustrates a case where no convex part 208 is provided and FIG. 4B illustrates a case of the present embodiment where the convex part 208 is provided.

In each of the antenna element parts 201 illustrated in FIG. 4A and FIG. 4B, since a current flows in a perpendicular direction with respect to the drawing sheet, a magnetic field is formed in a direction of a right-hand thread as indicated by arrows. As illustrated in FIG. 4A, without the convex part 208, the magnetic field enters a human body 403. In contrast, as illustrated in FIG. 4B, with the convex part 208 being arranged, the magnetic field is shielded by the convex part 208, so that the magnetic field passes between the antenna element part 201 and the convex part 208, resulting in a reduced SAR value.

In the present embodiment, the convex part 208 partially overlaps with the antenna element part 201 including the connection part 201e between the signal line 202 and the antenna element part 201 and the connection part 201c between the ground conductor 203a and the antenna element part 201 when viewed from the Z-axis direction. Thereby, in the present embodiment, a portion of the antenna element part 201 where a magnetic field is mainly formed is covered with the convex part 208 with respect to a human body located outside the outer casing 102, and therefore a magnetic field that correlates with the SAR value can be effectively shielded by the convex part 208. As a result, according to the present embodiment, the SAR value can be reduced. Further, since the SAR value can be reduced by the convex part 208 which itself forms the antenna, it is not necessary to secure a larger space between the antenna 101 and the outer casing 102.

FIG. 5A, FIG. 5B, FIG. 5C, and FIG. 5D are views schematically illustrating electric field distributions formed around an antenna element part for illustrating the principle of suppressing a decrease in the radiation efficiency in a state where the convex part 208 for reducing the SAR value is arranged according to the configuration of the antenna of the present embodiment. FIG. 5A, FIG. 5B, and FIG. 5C are perspective views each depicting only an antenna element part and ground conductors in a dotted line area of the antenna illustrated in FIG. 5D. In FIG. 5A, FIG. 5B, and FIG. 5C, electric fields formed due to radiation of an electromagnetic wave are schematically illustrated by arrows with solid lines. Note that, in FIG. 5A, FIG. 5B, and FIG. 5C, the positional relationship of the antenna element part and the ground conductors is depicted in an inverse manner to that of FIG. 5D for the purpose of illustration.

Each antenna of the FIG. 5A and FIG. 5B has an antenna element part 501 corresponding to the antenna element part 201, ground conductors 503a and 503b corresponding to the ground conductors 203a and 203b, and vias 505 corresponding to the vias 205. The antenna element part 501 has a longer part 501a and a shorter part 501b corresponding to the longer part 201a and the shorter part 201b, respectively.

FIG. 5A illustrates a case where, instead of the ground conductor 204 of the present embodiment, a ground conductor 504 having no convex part 208 is formed.

In contrast, FIG. 5B illustrates a case where, differently from the ground conductor 204 of the present embodiment, a convex part 508 overlapping with an open end 501d of the antenna element part 501 is formed to the ground conductor 506.

FIG. 5C illustrates a case where the convex part 208 not overlapping with the open end 201d of the antenna element part 201 is formed to the ground conductor 204 according to the present embodiment.

In the case illustrated in FIG. 5A, the electric field is stronger near the open end 501d of the antenna element part 501 and becomes weaker as approaching a connection part to the ground conductor 503a along the antenna element part 501. In the case illustrated in FIG. 5A, since the electric field is stronger near the open end 501d of the antenna element part 501, sufficient radiation efficiency can be obtained.

In contrast, in the case illustrated in FIG. 5B, with the convex part 508 being formed overlapping with the open end 501d of the antenna element part 501, electric fields formed between the antenna element part 501 and the ground conductor 506 are coupled causing a potential change. This electric field coupling prevents the radio wave from radiating from the antenna to the air, which results in a decrease in the radiation efficiency.

Therefore, in the present embodiment, in order to suppress electric field coupling described above as much as possible, the convex part 208 formed to the ground conductor 204 has a shape that does not overlap with the open end 201d as described above. This can suppress a decrease in the radiation efficiency in the present embodiment.

On the other hand, the magnitude of the SAR value correlates with the magnetic field intensity as described above, and a magnetic field is mainly formed near the connection part 201c between the antenna element part 201 and the ground conductor 203a and the connection part 201e between the antenna element part 201 and the signal line 202. In the present embodiment, the convex part 208 is formed to the ground conductor 204 so as to overlap with the connection part 201c between the antenna element part 201 and the ground conductor 203a and the connection part 201e between the antenna element part 201 and the signal line 202. Therefore, in the present embodiment, a magnetic field can be shielded by the convex part 208 and thus the SAR value can be reduced. Since the convex part 208 does not overlap with the open end 201d of the antenna element part 201 as described above, a decrease in the radiation efficiency can be suppressed.

Further, the convex part 208 is not formed of a member separate from the antenna 101 but formed to the ground conductor 204 forming the antenna 101. It is therefore unnecessary to provide an additional space for arranging the convex part 208 between the antenna 101 and the outer casing 102. Therefore, the present embodiment can realize a reduction in size and/or thickness of a wireless communication device and an electronic device having the antenna 101.

As discussed above, the present embodiment can reduce the SAR value while suppressing a decrease in the radiation efficiency. Further, according to the present embodiment, since the SAR value is reduced by the convex part 208 formed to the ground conductor 204 in the antenna 101, it is unnecessary to provide a larger space between the antenna 101 and the outer casing 102. Thus, the present embodiment can realize a reduction in size and/or thickness of a wireless communication device and an electronic device.

First Example

Based on the principle described by using FIG. 3, FIG. 4A, FIG. 4B, FIG. 4C, FIG. 5A, FIG. 5B, FIG. 5C, and FIG. 5D, numerical experiments described below were carried out as an example in order to show that the present embodiment can realize a reduction in size and/or thickness of a wireless communication device and an electronic device while reducing the SAR value. In the numerical experiments, the power supplied to the inverted F antenna was 13 dBm, and the communication frequency was 2.45 GHz. Further, calculation in the numerical experiments is performed by using MW-STUDIO that is an electromagnetic simulator from AET, Inc.

Figure 6A:
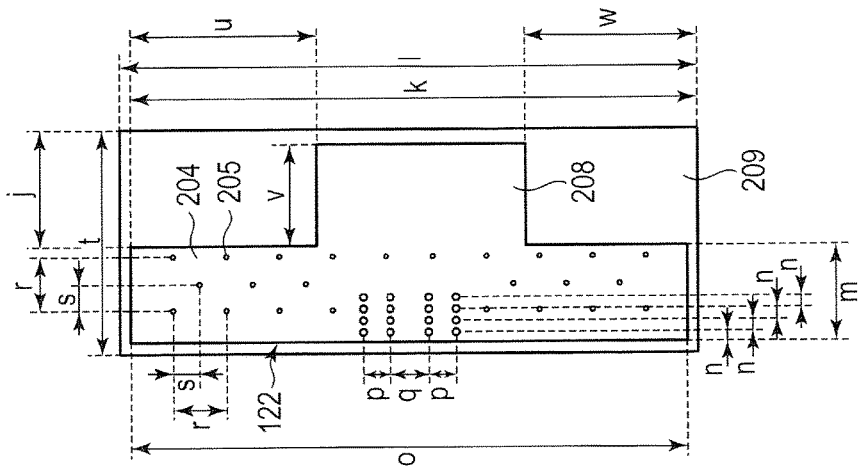
FIG. 6A, FIG. 6B, and FIG. 6C are plan views illustrating calculation models of antennae according to an example of the present invention.
Figure 6B:
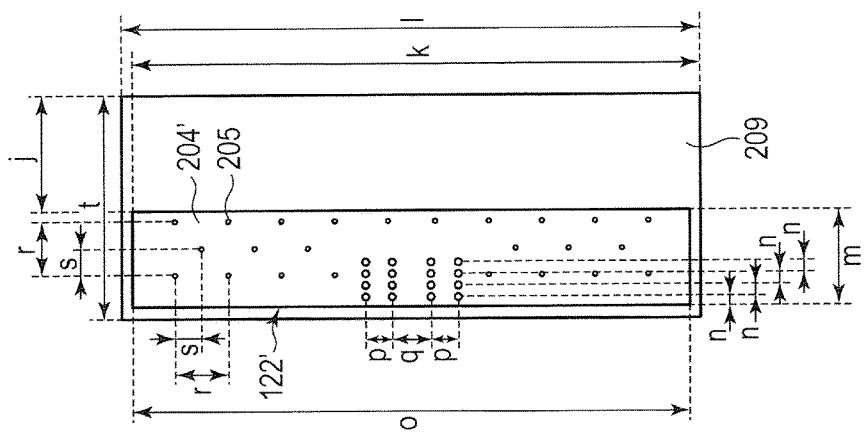
Figure 6C:
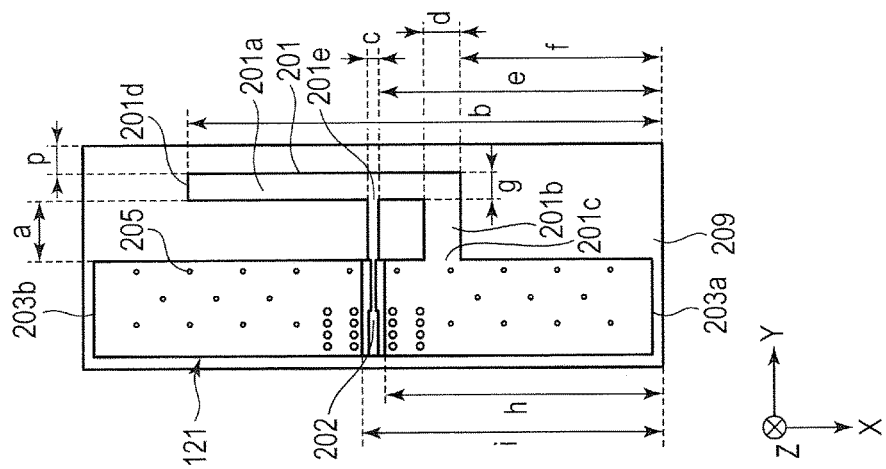

FIG. 6A, FIG. 6B, and FIG. 6C are views illustrating calculation models of antennae of a first example and a first comparative example of inverted F antennae each formed of a printed wiring board. FIG. 6A illustrates a first wiring layer 121 including the antenna element part 201 common to the first example and the first comparative example. FIG. 6B illustrates a second wiring layer 122' of the antenna according to the first comparative example. FIG. 6C illustrates a second wiring layer 122 to which the convex part 208 of the antenna is formed according to the first example. The antenna of the first comparative example is a two-layered printed wiring board having the first wiring layer 121 illustrated in FIG. 6A and the second wiring layer 122' illustrated in FIG. 6B. The antenna of the first example is a two-layered printed wiring board having the first wiring layer 121 illustrated in FIG. 6A and the second wiring layer 122 illustrated in FIG. 6C.

In each of the printed wiring boards, the thickness of a wiring was set to 35 µm, and the distance between the layers and the thickness of a dielectric of the printed wiring board were set to 0.8 mm. Further, the relative permittivity of the printed wiring board was set to 4.3 expecting the FR4, and the dielectric loss tangent tan δ was set to 0.025.

Figure 7:
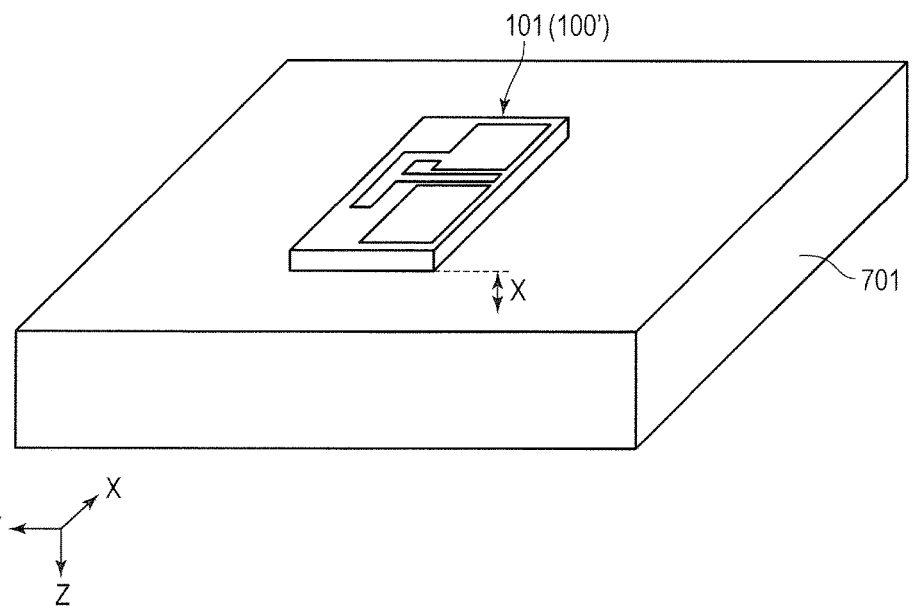
FIG. 7 is a perspective view illustrating an arrangement of an antenna with respect to a human body phantom.

FIG. 7 illustrates a calculation model when outputting the SAR value. As depicted, a human body phantom 701 and the antenna 101 of the first example or an antenna 101' of the first comparative example are arranged such that all the faces thereof are parallel to each other. The distance from the human body phantom 701 to the second wiring layer 122' of the antenna 101' (FIG. 6B) or the distance from the human body phantom 701 to the second wiring layer 122 (FIG. 6C) was x mm. Table 1 illustrates sizes a to w and the distance x depicted in FIG. 6A, FIG. 6B, FIG. 6C, and FIG. 7. Note that the values u to x of the sizes a to w and the distance x are variables.

TABLE 1

| size and distance [mm] of calculation model | | | | | | | | | | |
|---|---|---|---|---|---|---|---|---|---|---|
| symbol | a | b | c | d | e | f | g | h | i | j |
| size [mm] | 5.3 | 41.775 | 0.85 | 3.0 | 25.025 | 17.975 | 2.5 | 24.425 | 26.475 | 10.2 |
| symbol | | k | l | m | n | o | p | q | r | s | t |
| size [mm] | | 49.975 | 50.9 | 8.5 | 1.0 | 49.05 | 2.4 | 3.25 | 4.7 | 2.35 | 19.8 |
| symbol | | u | | | v | | | w | | | x |
| size [mm] | | variable | | | variable | | | variable | | | variable |

For calculation of the SAR value, a material constant of a solvent of a human body phantom used in measurement according to the international standard was used, and the conductivity σ was 2 S/m, the relative permittivity was 52.21, the tan δ was 0.28, the physical density ρ was 1000 kg/m³. The SAR value was obtained by measuring the electric field E inside the human body phantom and calculating the SAR value according to an equation expressed by: SAR value [W/kg]=E×E×ρ/σ.

With respect to the communication characteristics, the radiation efficiency was calculated in a state where the human body phantom was removed. The radiation efficiency was obtained by calculating a ratio of power supplied to the signal line at the communication frequency and the total power of radiated electromagnetic waves passing through points at a distance of 1 m from the antenna as the center.

Figure 8:
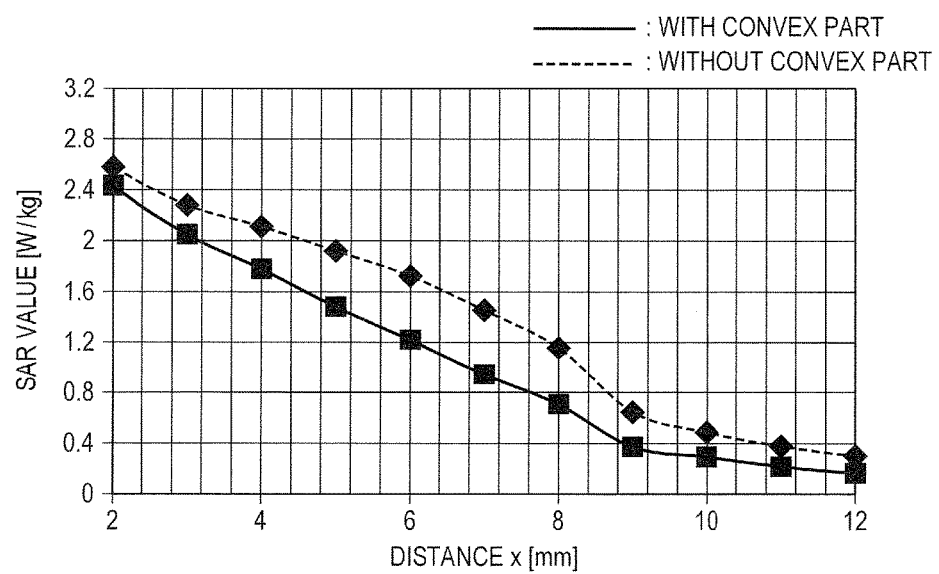
FIG. 8 is a graph illustrating calculation results of the SAR values in comparison between the antenna of a first example of the present invention and an antenna of a first comparative example.

FIG. 8 illustrates calculation results of the SAR values in comparison between the antenna of the first example and the antenna of the first comparative example. In FIG. 8, the dashed line represents a calculation result for the antenna of the first comparative example, and the solid line represents a calculation result for the antenna of the first example. In the antenna of the first example here, v=9.1, u=20, and w=10.925 were applied for the sizes v, u, and w of the convex part 208 formed to the ground conductor 204.

As illustrated in FIG. 8, it can be seen that an increase in the value of the distance x between the second wiring layer of the antenna and the human body phantom results in a decrease in the SAR value in both cases of the first example and the first comparative example. In comparison of the distance x at which the SAR value decreases below 1.6 W/kg that is a standard value of the SAR value, while the distance x at which the SAR value is 1.6 W/kg is x=6.5 mm in the antenna of the first comparative example, it is x=4.5 mm in the first example. This result shows that the first example allows for a reduction in the thickness, namely, the distance from the antenna to the outer casing down to approximately two-thirds the thickness of the first comparative example.

Figure 9A:
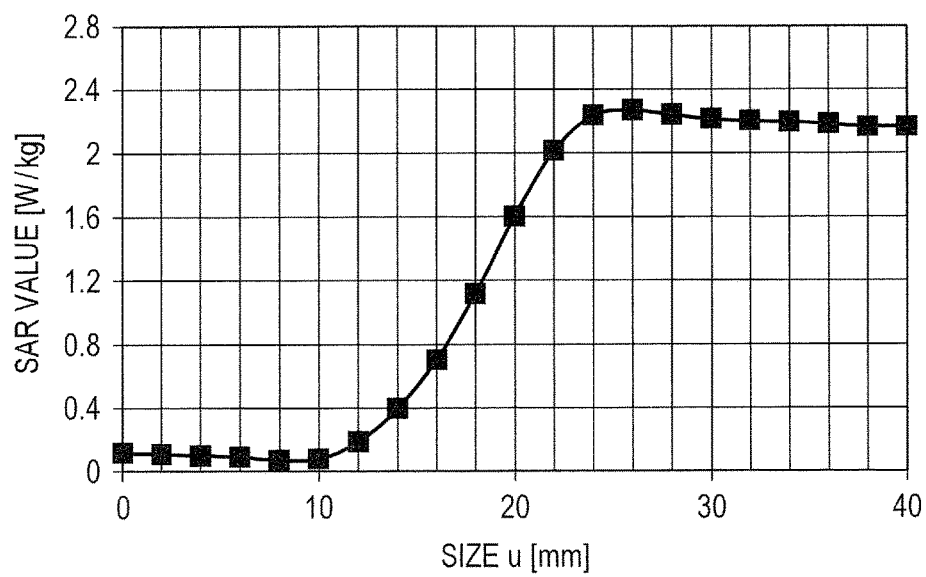
FIG. 9A is a graph illustrating a calculation result of the SAR value when a size u of a convex part of the antenna of the first example of the present invention is changed.
Figure 9B:
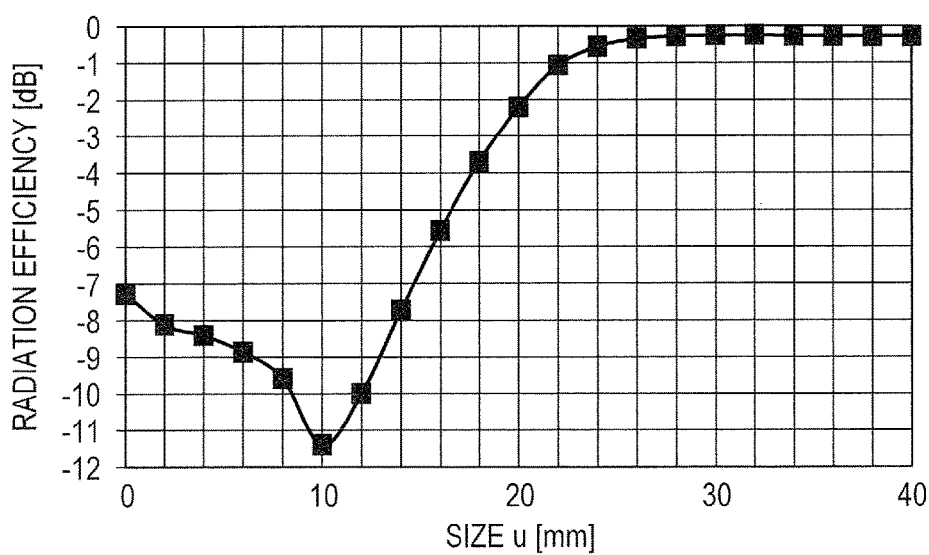
FIG. 9B is a graph illustrating a calculation result of the radiation efficiency when the size u of the convex part of the antenna of the first example of the present invention is changed.

FIG. 9A and FIG. 9B illustrate calculation results of the SAR value and the radiation efficiency with respect to the antenna of the first example when the value of the size u of the convex part 208 is changed, FIG. 9A illustrates a calculation result of the SAR value, and FIG. 9B illustrates a calculation result of the radiation efficiency. In the calculation, the distance x from the second wiring layer of the antenna to the human body phantom was fixed to x=4 mm, and the sizes v and w of the convex part 208 formed to the ground conductor 204 were fixed to v=9.1 and W=10.925. For the convex part 208 determined by these sizes, the relationship of the sizes a, f, g, and w illustrated in FIG. 6A, FIG. 6B, and FIG. 6C meets f>w and a+g<v. Thus, the convex part 208 overlaps with a part of the antenna element part 201 and the connection part 201c between the antenna element part 201 and the ground conductor 203a when viewed from the Z-axis direction.

The value u=8.2 is a value when one end of the convex part 208 overlaps with the open end 201d of the antenna element part 201. The value u=24.1 is a value when the one end of the convex part 208 overlaps with the signal line 202. Note that the one end of the convex part 208 means, of the ends in the X-axis direction of the convex part 208, an end in the open end 201d side of the antenna element part 201.

As illustrated in FIG. 9A, it can be seen that the SAR value decreases when u≤24.1, that is, when the antenna element part 201 is covered with the convex part 208 by a larger area than a region covering the connection part 201e connected to the signal line 202. Thus, in order to allow for a reduction in size and/or thickness, the convex part 208 is required to cover the connection part 201e connected to the signal line 202 that is a power supply part of the antenna element part 201.

Further, the SAR value is the minimum when u=10, and the SAR value is maintained low in the range of u<10 even when the value u is changed and there is no change in the effect of a reduction in size and/or thickness. In the first example, the length corresponding to the size L of the antenna element part 201 is calculated to be 28.85 mm based on FIG. 6A, FIG. 6B, and FIG. 6C. Therefore, the value of u=10 is a value when the distance from the open end 201d of the antenna element part 201 to the one end of the convex part 208 is around 2 mm, which is around one-tenth the size L of the antenna element part 201.

It is therefore preferable that the size u of the convex part 208 be greater than or equal to a value where the distance from the open end 201d of the antenna element part 201 to the one end of the convex part 208 is one-tenth the size L of the antenna element part 201 and be less than or equal to a value where the one end of the convex part 208 overlaps with the signal line 202. That is, the one end of the convex part 208 is preferably located between the position where the distance from the open end 201d is one-tenth the size L of the antenna element part 201 and the position that overlaps with the signal line 202. That is, the one end of the convex part 208 is preferably located in a position between the point where the distance from the open end 201d of the antenna element part 201 is one-tenth the size L and the connection part 201e between the antenna element part 201 and the signal line 202 when viewed from the normal direction of the printed wiring board.

On the other hand, as illustrated in FIG. 9B, it can be seen that, in a similar manner to the reduction of the SAR value, the radiation efficiency decreases as the value u decreases from the value in u≤24.1. The relationship between a reduction effect of the SAR value and the radiation efficiency with respect to the size of the convex part 208 will be described below.

According to calculation for the antenna of the first comparative example without the convex part 208, in a case of the distance x=4 mm, the SAR value is 2.2 W/kg and the radiation efficiency is −0.27 dB, which means that 98% of the supply power input from the signal line 202 is radiated.

In contrast, based on FIG. 9A and FIG. 9B, it is when u=20 that formation of the convex part 208 causes the SAR value to decrease to the standard value 1.6 W/kg, namely, to 72%. The radiation efficiency in this case is reduced to −2.2 dB, namely, by 39%, which means that 60% of the supply power input from the signal line is radiated. Furthermore, it is when u=18 that formation of the convex part 208 causes the SAR value to decrease to the standard value 1.1 W/kg, namely, decrease by half. The radiation efficiency in this case is reduced to −3.7 dB, namely, by 57%, which means that 42% of the supply power input from the signal line is radiated.

In such a way, the relationship between a reduction effect of the SAR value and the radiation efficiency with respect to the size of the convex part is a tradeoff relationship. Therefore, in practice, the size of the convex part can be determined by a desired reduction amount of the SAR value and a desired radiation efficiency.

Figure 10:
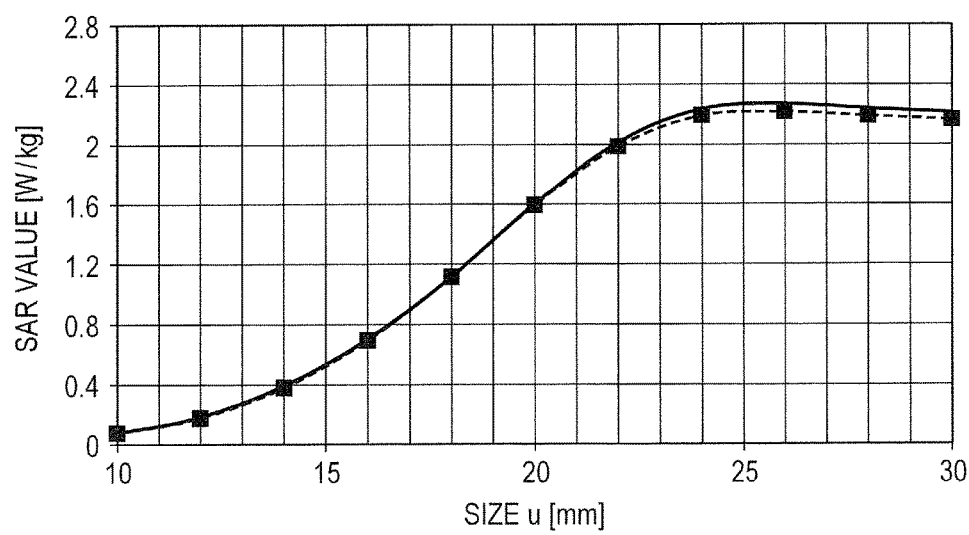
FIG. 10 is a graph illustrating a calculation result of the SAR value when a size v of the convex part of the antenna of the first example of the present invention is changed.
Figure 11:
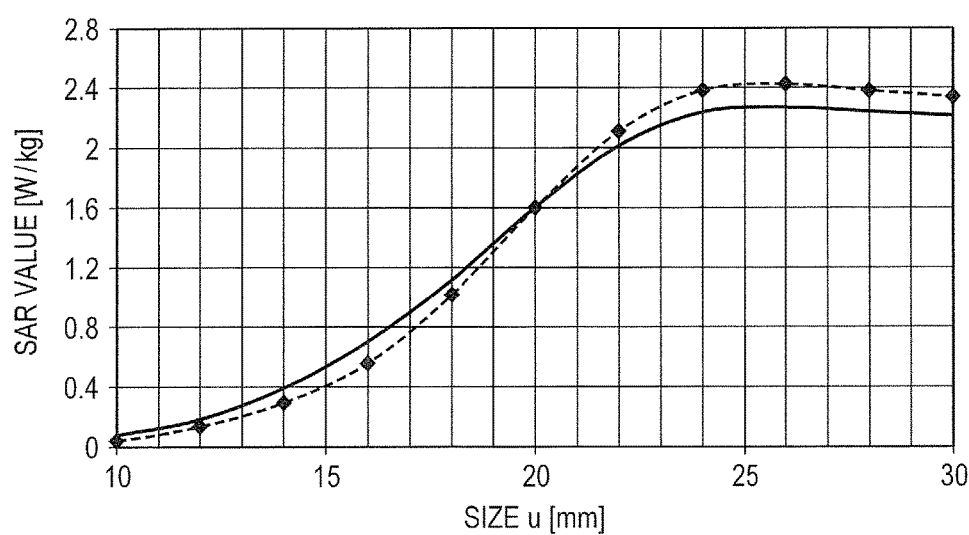
FIG. 11 is a graph illustrating a calculation result of the SAR value when a size w of the convex part of the antenna of the first example of the present invention is changed.

Next, based on the principle of FIG. 3, it will be shown that, with the convex part 208 covering the connection part 201e between the antenna element part 201 and the signal line 202 and the connection part 201c between the antenna element part 201 and the ground conductor 203a where the magnetic field intensity is high, there is no influence on the reduction characteristics of the SAR value. To this end, calculation similar to that illustrated in FIG. 9A and FIG. 9B is carried out with changes of the sizes v and w of the convex part. FIG. 10 and FIG. 11 illustrate calculation results.

FIG. 10 illustrates a calculation result of the SAR value obtained by changing the value of the size u when the size v of the convex part 208 was changed from 9.1 mm to 13 mm, the solid line represents the case of v=13 mm, and the dashed line represents the case of v=9.1 mm. In a similar manner to the case of v=9.1 mm, the case of v=13 mm corresponds to a state where the convex part 208 covers the connection part 201e between the antenna element part 201 and the signal line 202 and the connection part 201c between the antenna element part 201 and the ground conductor 203a. It can be seen from FIG. 10 that, with the convex part 208 covering the connection parts 201e and 201c, there is no influence on the reduction characteristics of the SAR value even when the size v is changed.

FIG. 11 illustrates a calculation result of the SAR value obtained by changing the value of the size u when the size w of the convex part 208 was changed from 10.925 mm to 14.925 mm, the solid line represents the case of w=14.925 mm, and the dashed line represents the case of w=10.925 mm. In a similar manner to the case of w=10.925 mm, the case of v=14.925 mm corresponds to a state where the convex part 208 covers the connection part 201e between the antenna element part 201 and the signal line 202 and the connection part 201c between the antenna element part 201 and the ground conductor 203a. It can be seen from FIG. 11 that, with the convex part 208 covering the connection parts 201e and 201c, there is no influence on the reduction characteristics of the SAR value even when the size w is changed.

Note that, although the convex part 208 in the antenna of the first example has a rectangular planer shape defined by the sizes u, v, and w, the planer shape of the convex part 208 may be other shapes.

Second Embodiment

An antenna, a wireless communication device, and an electric device of the second embodiment of the present invention will be described by using FIG. 12 to FIG. 14B. Note that the same components as those in the antenna of the first embodiment are labeled with the same reference numerals as those in the first embodiment, and the description thereof will be omitted or simplified.

The first embodiment and the first example described above have shown that the SAR value is reduced by forming the convex part 208 that is located between the antenna element part 201 and the human body and formed to the ground conductor 204 formed in a wiring layer different from the antenna element part 201 to cover the antenna element part 201. As a result, it is possible to put the antenna element part 201 close to a human body, which allows for a reduction in size and/or thickness of the external dimensions of a wireless communication device and an electronic device.

The present embodiment and a second example described later will show that the reduction amount of the SAR value is increased by a high permittivity part made of a high permittivity material partially arranged to the antenna of the first embodiment and the first example, which allows for a further reduction in size and/or thickness of a wireless communication device and an electronic device.

Figure 12:
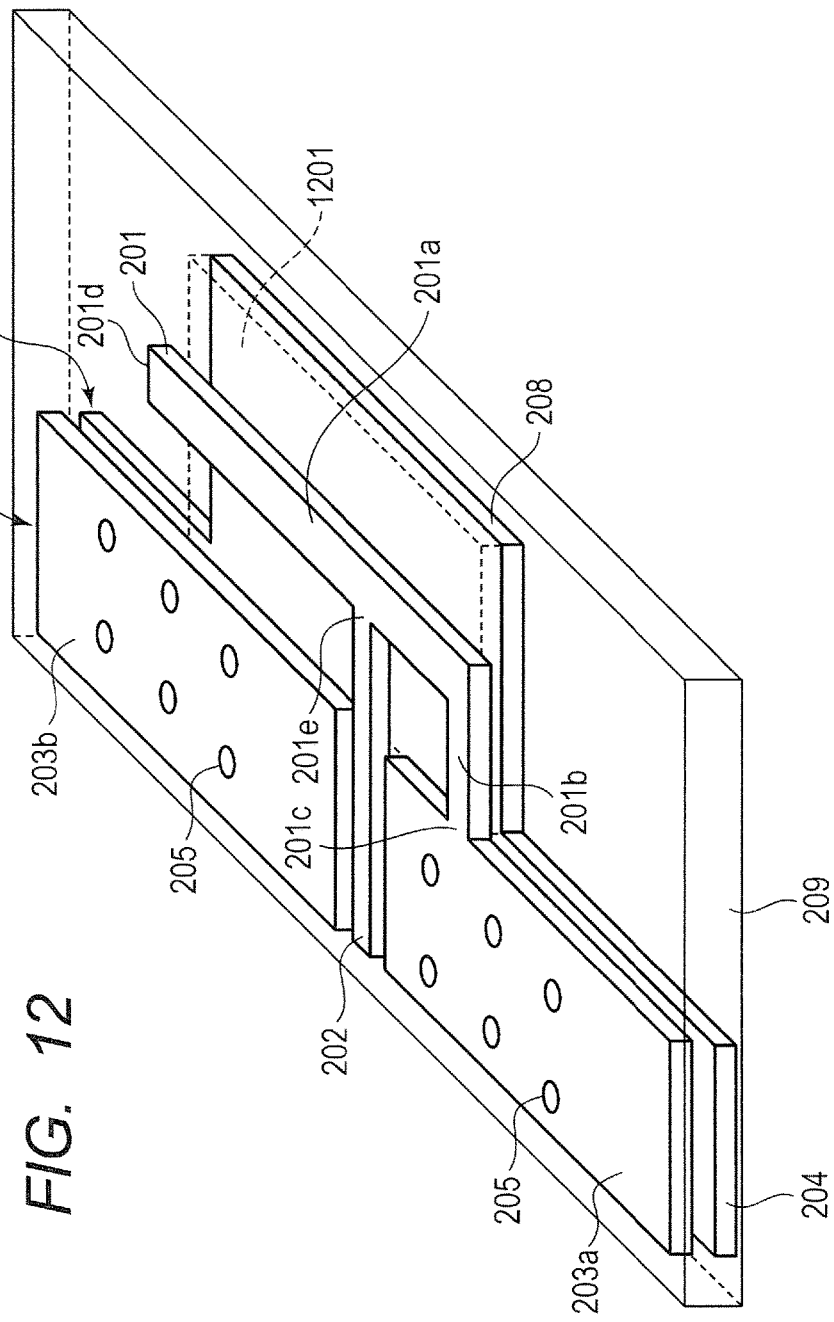
FIG. 12 is a perspective view illustrating an antenna according to a second embodiment of the present invention.

FIG. 12 is a perspective view illustrating an antenna of the present embodiment. An antenna 1101 of the present embodiment is similar to the antenna of the first embodiment except that a high permittivity part 1201 made of a high permittivity material is partially arranged to the antenna of the first embodiment described above.

As illustrated by the dashed line in FIG. 12, the high permittivity part 1201 whose relative permittivity is higher than other parts is provided in the substrate 209. The high permittivity part 1201 is arranged between the first wiring layer 121 and the second wiring layer 122 so as to overlap with the convex part 208. In the case illustrated in FIG. 12, the high permittivity part 1201 is arranged so as to overlap with the entire convex part 208. Note that the high permittivity part 1201 is not required to overlap with the entire convex part 208 and may also be arranged partially overlapping with the convex part 208. The high permittivity part 1201 may be provided in at least a predetermined region on the convex part 208. The predetermined region in this context is a region where the antenna element part 201 including the connection part 201e and the connection part 201c partially overlaps with the convex part 208 when viewed from the normal direction of the printed wiring board.

The high permittivity part 1201 is a portion whose relative permittivity is higher than other portions of the substrate 209 in the printed wiring board forming the antenna 1101. The high permittivity material of the high permittivity part 1201 is, for example, a ceramics material whose relative permittivity is higher than or equal to 28 and lower than or equal to 32 and is higher than the relative permittivity of a dielectric of the substrate 209. For example, a BaO—$TiO_2$—ZnO-based ceramics material can be used as the high permittivity material of the high permittivity part 1201.

Note that the high permittivity part 1201 can be formed, for example, by mechanically machining a part of the substrate 209 of the printed wiring board forming the antenna 1101 and arranging the high permittivity material in the machined part. Alternatively, for example, an electronic component that is implemented between different wiring layers of the printed wiring board and has a built-in component made of ceramics material may be utilized as the high permittivity part 1201.

The antenna 1101 of the present embodiment may be built into the camera 10 and form a wireless communication device together with the IC 108 in a similar manner to the case of the first embodiment.

The fact that the reduction amount of the SAR value is increased by the high permittivity part 1201 being arranged will now be described by using FIG. 13A, FIG. 13B, and FIG. 13C. As illustrated by using FIG. 3, FIG. 4A, FIG. 4B, and FIG. 4C, the SAR value is reduced in the first embodiment by using the convex part 208 to suppress the transmission amount of a magnetic field formed by the antenna 101 into a human body. However, the convex part 208 is formed so as not to overlap with the open end 201*d* of the antenna element part 201 in order to suppress a decrease in the radiation efficiency. The structure in which the convex part 208 does not overlap with the open end 201*d* causes an electric field to be formed between the open end 201*d* and the ground conductors 203*b* and 204 as illustrated in FIG. 5C. After coupling to the ground conductors 203*b* and 204, this electric field causes a return current flowing on the ground conductors 203*b* and 204 and forms a loop between the antenna element part 201 and the ground conductors 203*b* and 204.

The current flowing in the ground conductor 204 may cause an increase in the SAR value, because the ground conductor 204 is located in the human body side and thus a magnetic field formed by this current propagates into the human body.

FIG. 13A schematically illustrates a current flowing on the surface of the ground conductor 204 in the human body side in the case illustrated in FIG. 5C. FIG. 13A schematically illustrates a current by arrows with dashed lines. As illustrated in FIG. 13A, the return current flows over a wide area of the ground conductor 204 through the vias 205 as paths depending on a region where the electric field is coupled.

FIG. 13B schematically illustrates an electric field of the same region as in FIG. 5C when the high permittivity part 1201 illustrated in FIG. 12 is arranged. In FIG. 13B, the electric field formed at radiation of electromagnetic waves is schematically illustrated by arrows with solid lines. As illustrated in FIG. 13B, the arrangement of the high permittivity part 1201 in a region overlapping with the convex part 208 allows an electric field to be formed in the convex part 208 side and formed closer to a space between the ground conductor 203*b* and the ground conductor 204 compared to the case illustrated in FIG. 5C. This results in a reduction of the electric field area that would otherwise be formed in a wide area between the open end 201*d* and the ground conductor 203*b*.

FIG. 13C schematically illustrates a current flowing on the surface of the ground conductor 204 in the human body side in the case illustrated in FIG. 13B. FIG. 13C schematically illustrates a current by arrows with dashed lines. As illustrated in FIG. 13C, the arrangement of the high permittivity part 1201 reduces the amount of a current flowing on the surface of the ground conductor 204 in the human body side. This allows for a further reduction of the magnetic field propagating in a human body and therefore a further reduction of the SAR value.

As discussed above, in the present embodiment, the arrangement of the high permittivity part 1201 increases the amount of the reduction of the SAR value compared to the first embodiment, which allows for a further reduction in size and/or thickness of the external dimensions of a wireless communication device.

Second Example

Based on the principle described above, numerical experiments described below were carried out as an example. In the numerical experiments, a rectangular parallelepiped region defined by the size v, the size (k−u−w), and 0.8 mm, which is the thickness of the dielectric, is provided to the calculation model illustrated in FIG. 6A, FIG. 6B, and FIG. 6C. The SAR value and the radiation efficiency value were calculated for the condition where the relative permittivity of only this region was changed without changing the relative permittivity of other regions from 4.3. The sizes were set as u=20, w=10.925, k=49.975, v=9.1, and (k−u−w)=19.05. Further, the distance x was 4 mm. Note that calculation conditions were the same as the cases illustrated in FIG. 6A, FIG. 6B, FIG. 6C, and FIG. 7 of the first example, the power supplied to the inverted F antenna was 13 dBm, and the communication frequency was 2.45 GHz. Further, calculation in the numerical experiments is performed by using MW-STUDIO that is an electromagnetic simulator from AET, Inc.

Figure 14A:
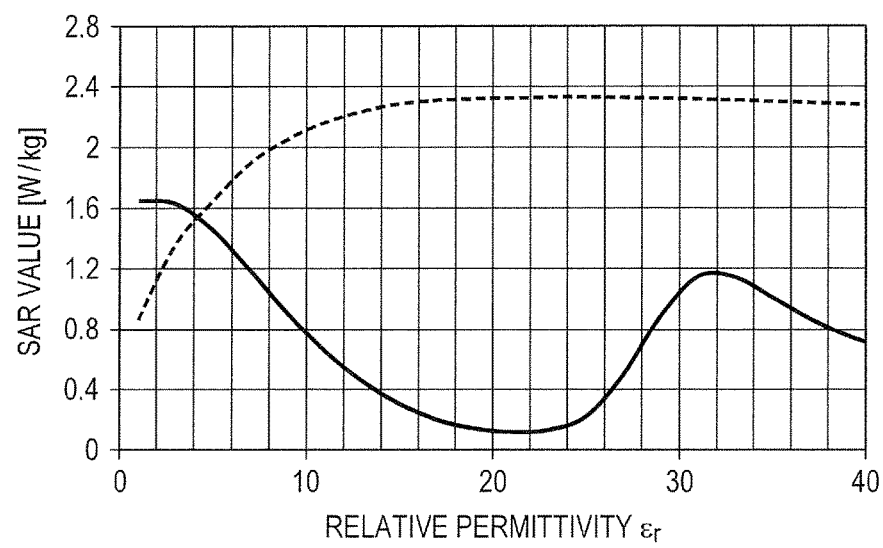
FIG. 14A is a graph illustrating a calculation result of the SAR value of an antenna according to a second example of the present invention.
Figure 14B:
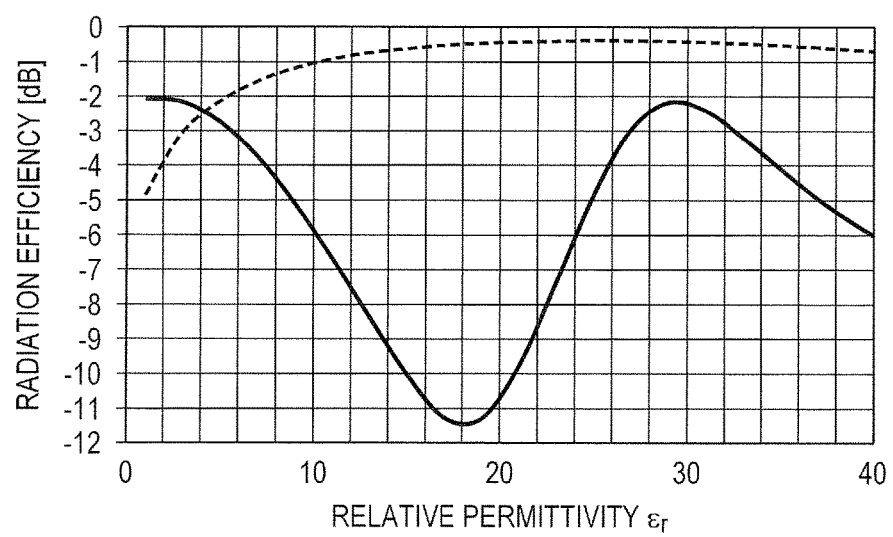
FIG. 14B is a graph illustrating a calculation result of the radiation efficiency of the antenna according to the second example of the present invention.

FIG. 14A and FIG. 14B illustrate calculation results of the SAR value and the radiation efficiency, respectively. In FIG. 14A and FIG. 14B, the solid line represents a result when only the relative permittivity of the above-described region defined by the size v and the size (k−u−w) overlapping with the convex part 208 is changed. For reference, in FIG. 14A and FIG. 14B, the dashed lines represent a calculation result when the relative permittivity of a region of a rectangular parallelepiped of the open end 201*d* side, that is, a region defined by the size v, the size u, and 0.8 mm, which is the thickness of the dielectric, is changed and the relative permittivity of other regions is not changed from 4.3.

First, as illustrated by the solid lines of FIG. 14A and FIG. 14B, in focusing on values where the relative permittivity is approximately 28 to 32 in comparison with the case where the relative permittivity is 4.3, it can be seen that the SAR value decreases from 1.6 W/kg to 1.2 W/kg while the radiation efficiency does not change significantly. The case where the relative permittivity is 4.3 corresponds to the case where the high permittivity part 1201 is not arranged. With the high permittivity part 1201 being arranged to the region of the convex part 208, the second example can reduce the size and/or the thickness to three-fourths that of the first example.

On the other hand, as illustrated in the dashed lines in FIG. 14A and FIG. 14B, the SAR value decreases when the high permittivity part made of a high permittivity material is partially provided in the open end 201*d* side only of the antenna element part 201. Therefore, in this case, the advantage of the reduction in size and/or thickness is not obtained.

The reason why the SAR value decreases when a high permittivity part is partially provided only in the open end 201*d* side of the antenna element part 201 is as follows. In this case, an electric field is not formed as illustrated above by using FIG. 13B but formed in the open end 201*d* side of the antenna element part 201 and formed close to a space between the ground conductor 203b and the ground conductor 204. As a result, the amount of a current flowing on the surface of the ground conductor 204 in the human body side becomes larger than that in the case illustrated in FIG. 13A and therefore the SAR value decreases.

As a result of an electric field is formed closer to the open end 201d side of the antenna element part 201, however, the radiation efficiency is improved. Thus, a partial arrangement of a high permittivity part in the open end 201d side of the antenna element part 201 allows for the advantage of reduced supply power for the same SAR value or the same external dimensions of the wireless communication device. Therefore, for the purpose of reducing supply power, a high permittivity part may be partially arranged in the open end 201d side of the antenna element part 201.

Note that, when the relative permittivity of the substrate 209 made of the dielectric illustrated in FIG. 6A, FIG. 6B, and FIG. 6C is entirely changed rather than partially changed, no change occurs in the formation of an electric field. Thus, there will be only a slight change in the SAR value and the radiation efficiency, and the advantage of a reduced size and/or thickness or reduced supply power is not obtained.

Modified Embodiment

The present invention is not limited to the embodiments described above, and various modifications are possible.

For example, although a digital still camera that is an imaging device has been exemplified as an electronic device having a wireless communication function in the above-described embodiment, an electronic device is not limited thereto. An electronic device having a wireless communication function may be a communication terminal such as a mobile phone, a smartphone, or the like, a personal computer (PC) such as a notebook PC, a tablet PC, in addition to the imaging device such as a digital still camera, a digital video camera, or the like. An electronic device according to one embodiment of the present invention can be configured to have an antenna according to the embodiments described above, a communication unit that transmits and receives a signal via the antenna, and a signal processer that processes the signal.

Further, although the above-described embodiments have exemplified a case where the antenna 101 is built into the camera 10 that is an electronic device, and the IC 108 and the antenna 101 built into the camera 10 form a wireless communication device, the wireless communication device is not limited thereto. The wireless communication device according to the embodiments of the present invention may also have an antenna according to the embodiments described above and a communication unit that transmits and receives a signal via the antenna and may be configured to be used in connection with an electronic device.

Further, although the above-described embodiments have exemplified a case where the antenna element part 201, the signal line 202, and the ground conductors 203a and 203b are formed in the same layer of the first wiring layer 121, the arrangement is not limited thereto. The antenna element part 201, the signal line 202, and the ground conductors 203a and 203b may be formed in different wiring layers. In this case, the antenna element part 201 and the signal line 202 may be electrically connected through one or more vias, and the antenna element part 201 and the ground conductor 203a may also be electrically connected through one or more vias.

Further, although the inverted F antenna has been exemplified as an antenna in the above-described embodiments, an antenna is not limited thereto, and the present invention is applicable to various types of antennae.

According to the embodiments of the present invention, a reduction in size and/or thickness of a wireless communication device and an electronic device can be realized with a reduction of the SAR value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-009751, filed Jan. 21, 2016, which is hereby incorporated by reference herein in its entirety.

What is claimed is:

1. An antenna comprising:
   a substrate on or in which an antenna element part having an open end, a signal line connected to the antenna element part, and a first ground conductor connected to the antenna element part are formed; and
   a printed wiring board in which a second ground conductor electrically connected to the first ground conductor is formed in a different layer from the first ground conductor,
   wherein the second ground conductor has a shield part that partially overlaps with the antenna element part including a connection part between the antenna element part and the signal line and a connection part between the antenna element part and the first ground conductor and does not overlap with the open end of the antenna element part when viewed from a normal direction of the printed wiring board.

2. The antenna according to claim 1, wherein
   a first layer and a second layer are formed on or in the substrate,
   the antenna element part, the first ground conductor, and the signal line are formed in the first layer, and
   the second ground conductor is formed in the second layer.

3. The antenna according to claim 1, wherein
   the antenna element part has a first part and a second part bent from the first part in a direction intersecting the first part,
   an end in the second part side of the antenna element part is connected to the first ground conductor, and
   the signal line is formed in a side to which the second part is bent, and is connected to the first part.

4. The antenna according to claim 1, wherein, when viewed from the normal direction of the printed wiring board, an end of the shield part in the open end side of the antenna element part is located between a point at a distance of one-tenth the total length of the antenna element part from the open end of the antenna element part and the connection part between the antenna element part and the signal line.

5. The antenna according to claim 1, wherein
   the substrate has a high permittivity part whose relative permittivity is higher than other parts, and
   the high permittivity part is provided in a region where the antenna element part including the connection part between the antenna element part and the signal line and the connection part between the antenna element part and the first ground conductor partially overlaps with the shield part when viewed from the normal direction of the printed wiring board.

6. The antenna according to claim 5, wherein a relative permittivity of the high permittivity part is higher than or equal to 28 and lower than or equal to 32.

7. The antenna according to claim 6, wherein a dielectric of the high permittivity part is a ceramics material.

8. A wireless communication device comprising an antenna, wherein the antenna has
- a substrate on or in which an antenna element part having an open end, a signal line connected to the antenna element part, and a first ground conductor connected to the antenna element part are formed; and
- a printed wiring board in which a second ground conductor electrically connected to the first ground conductor is formed in a different layer from the first ground conductor,
- wherein the second ground conductor has a shield part that partially overlaps with the antenna element part including a connection part between the antenna element part and the signal line and a connection part between the antenna element part and the first ground conductor and does not overlap with the open end of the antenna element part when viewed from a normal direction of the printed wiring board.

9. An electronic device comprising:
an antenna;
a communication unit that transmits or receives a signal via the antenna; and
a signal processing unit that processes the signal,
wherein the antenna has
- a substrate on or in which an antenna element part having an open end, a signal line connected to the antenna element part, and a first ground conductor connected to the antenna element part are formed; and
- a printed wiring board in which a second ground conductor electrically connected to the first ground conductor is formed in a different layer from the first ground conductor,
- wherein the second ground conductor has a shield part that partially overlaps with the antenna element part including a connection part between the antenna element part and the signal line and a connection part between the antenna element part and the first ground conductor and does not overlap with the open end of the antenna element part when viewed from a normal direction of the printed wiring board.

* * * * *